United States Patent [19]
Huttenhoff

[11] 3,747,070
[45] July 17, 1973

[54] DATA FIELD TRANSFER AND MODIFICATION APPARATUS

[75] Inventor: John Harry Huttenhoff, Wheaton, Ill.

[73] Assignee: Bell Telephone Laboratories, Incorporated, Murray Hill, N.J.

[22] Filed: Dec. 22, 1971

[21] Appl. No.: 211,012

[52] U.S. Cl. .......... 340/172.5
[51] Int. Cl. .......... G11c 19/00, G06f 7/00
[58] Field of Search .......... 340/172.5

[56] References Cited

UNITED STATES PATENTS

| | | | |
|---|---|---|---|
| 3,371,320 | 2/1968 | Lachenmayer | 340/172.5 |
| 3,596,251 | 7/1971 | Buchan et al. | 340/172.5 |
| 3,264,397 | 8/1966 | Glickman et al. | 340/172.5 |
| 3,473,160 | 10/1969 | Wahlstrom | 340/172.5 |
| 3,514,760 | 5/1970 | Kautz | 340/172.5 |
| 3,436,737 | 4/1969 | Iverson et al. | 340/172.5 |
| 3,311,896 | 3/1967 | Delmerge, Jr. et al. | 340/172.5 |
| 3,610,903 | 10/1971 | Stokes et al. | 340/172.5 |

*Primary Examiner*—Gareth D. Shaw
*Attorney*—W. L. Keefauver

[57] ABSTRACT

Apparatus for transferring a field of digital data in parallel from one position in an input data word to a different position in an output word is disclosed. A plurality of cascaded stages are used to achieve a required shifting; partial shifting occurs as an input word proceeds through each stage. Means are also provided to modify the content (as well as position) of an input word. By suitably combining redundant data paths, the logic connections in each stage are reduced.

5 Claims, 9 Drawing Figures

DATA FIELD TRANSFER AND MODIFICATION APPARATUS

GOVERNMENT CONTRACT

The invention herein claimed was made in the course of or under a contract with the Department of the Army.

BACKGROUND OF THE INVENTION

1. Field of the Invention

This invention relates to digital data handling and, more particularly, to apparatus for transferring a field of digital information from one position to another.

In a digital computer there are many operations that require the transfer of a field of digital data stored in a register to a different position in the same or a different register. Such a transfer must also be executed in other data handling applications than computers. The conventional way to transfer a field of data from one position to another is to shift it serially. The term "shift" is commonly used in a broad sense to include a rotation operation. In a rotation operation the bits displaced out of one end of the register are placed into the digit places at the other end of the register. When it is used in a narrow sense, the term "shift" describes an operation in which the bits displaced out of the digit places at one end are discarded and bits having the value 0 are placed into the digit places at the other end. By serial shifting it is meant that the transfer proceeds one digit position at a time. The time required to execute a transfer of data in and out of the registers in this fashion is directly related to the number of digit places in the registers. Thus, the execution time may become prohibitive in a data handling system that has large registers and deals with data words having many digit places.

A typical application for the function of shifting fields of data from one position in a data word to another position in a word is that described in co-pending patent application Ser. No. 54,522 by R. R. Shively et al. filed July 13, 1970 (now U.S. Pat. No. 3,701,976, issued Oct. 31, 1972) and assigned to the assignee of the present invention.

2. Prior Art

There have, of course, been many other circuit organizations for performing the shift of fields of data in the above-discussed manner. Typical circuitry employed for this purpose is described, for example, in U. S. Pats., No. 3,436,737 issued Apr. 1, 1969 to G. J. Iverson et al; No. 3,350,692 issued Oct. 31, 1967 to W. B. Cagle et al.; No. 3,543,245 issued Nov. 24, 1970 to G. Nutter; and No. 3,553,652 issued Jan. 5, 1971 to L. G. Hanson.

An important consideration in the design and implementation of shift circuits, or shifters, is the minimization of the number of control and signal paths required. In particular, when designing a shift circuit for implementation using integrated circuit techniques, it is of paramount importance to reduce the number and complexity of interconnections among signal paths and to reduce the number of gates to avoid crowding on the integrated circuit substrate. Since the substrate on which logic circuits are typically implemented is basically a planar structure, parallel signal paths impose additional requirements for substrate area and introduce an increased possibility of circuit failure.

Accordingly, it is an object of the present invention to provide simplified implementation of a shifter circuit for translating fields of data in a data processing system.

It is a further object to provide means for implementing a shifter circuit on an integrated circuit substrate having increased reliability and decreased complexity.

SUMMARY OF THE INVENTION

In typical embodiment, the present invention provides for a cascaded arrangement of shift stages, each under independent control of a particular byte in a control word. By recognizing the essential parallelism in many of the signal carrying paths in prior art systems relating, for example, to otherwise similar left and right shifts, it has been found possible to reduce the complexity of shifter circuits relative to those employed in the prior art. In particular, it has been found that it is possible to use a single signal carrying path to implement in part a required right shift, for example, which may also be used to implement, in part, a corresponding left shift. The combination of signal paths in this manner also permits a reduction in the number of gate circuits used to steer input signals through successive shifter stages.

Further, the present invention provides means for modifying data as it is translated by the shift circuit. That is, there is provided, in a typical embodiment, additional control circuitry for permitting the simultaneous shift and modification of a data word in an arbitrary manner.

BRIEF DESCRIPTION OF THE DRAWING

The above-described objects have been realized in accordance with the present invention, a typical embodiment of which is disclosed in the following detailed description which should be read in connection with the attached drawing wherein.

DETAILED DESCRIPTION

Figure 1:
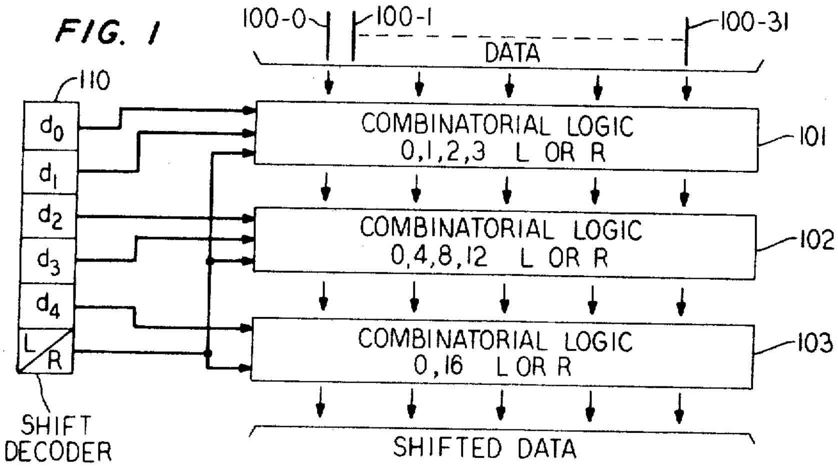
FIG. 1 shows the general organization for a shifter circuit in accordance with one embodiment of the present invention.

FIG. 1 shows the overall organization for a shifter circuit in accordance with one embodiment of the instant invention. For the sake of definiteness, it will be assumed that each data word to be 0, 1, will comprise 32 bits, numbered 0 through 31. Further, it will be assumed that a shift of from 0 to 31 bits is desired. In FIG. 1 data words are shown as appearing on a plurality of leads 100–$i$, $i$=0,1, . . . ,31. These data are shown entered in parallel into a first stage of combinatorial logic designated 101 in FIG. 1. These data signals are then partially shifted in logic stage 101 and are passed in parallel to subsequent stages 102 and 103 where the shifting operations are completed. The extent of a shift and the direction of a shift are determined by the contents of a shift decoder register 110. The digit designations shown in shift decoder 110 designate the extent and direction of a particular shift. The relationship by which the shift extent is determined is $D = d_4 2^4 + d_3 2^3 + d_2 2^2 + d_1 2^1 + d_0 2^0$. Finally, the direction of the shift is determined by the L/R bit.

As is indicated in the shift stages 101, 102, 103, a total shift is effected by three sequential partial shifts. Stage 101 performs a shift of 0, 1, 2, or 3 digit positions in either the left or right direction. Similarly, stages 102 and 103 accomplish partial shifts in the amounts indicated in the blocks of FIG. 1.

As was indicated above, a prime consideration in any shifter circuit is the minimization of the number of interconnecting leads. This is particularly true when it is desired that the overall circuit configuration be realized in the form of a single essentially planar structure—such as an integrated circuit substrate. Accordingly, an important feature of the instant invention relates to means for minimizing the number of data paths required to be maintained on a planar structure. To illustrate the manner in which this minimization is achieved, it is helpful to consider the paths along which data are required to flow in accordance with the sequential partial shifting described briefly above. For this purpose, reference to FIGS. 2A–2E is helpful. It is convenient for purposes of referencing the data word at each stage to identify the respective input words to the 3 stages by the corresponding labels *a, b, c,* with attached subscripts indicating digit positions. Thus the input to stage 101, for example includes digits $a_0$ through $a_{31}$ and the output from the first stage 101 includes the digits $b_i$, $i = 0, 1, \ldots, 31$.

Figure 2A:
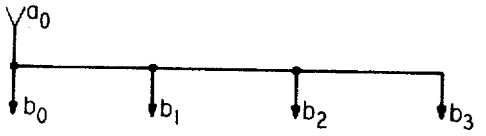
FIGS. 2A–2E show signal flow paths illustrating the manner in which bits are shifted in the various stages of the circuit of FIG. 1.

FIG. 2A shows the signal paths which a given bit—say bit $a_0$—experiences in passing through the first stage of the shifter in FIG. 1. Thus a data bit arriving in position $a_0$ can go to digit position $b_0$, thereby experiencing no shift. It is also convenient to indicate explicityly the shift encountered by each data bit on passing through a given stage. Thus for the example of a bit in digit position $a_0$ passing to digit position $b_0$, it is convenient to identify the shift by the nomenclature OR. Similarly, if digit $a_0$ were translated to digit position $b_1$, the shift would be indicated by the designation 1R. Likewise, a shift of 2R and 3R would be associated with the translation of digit $a_0$ to $b_2$ and $b_3$, respectively.

Figure 2B:
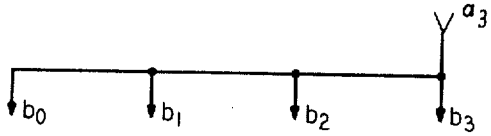

FIG. 2B shows a corresponding shift for a digit, say $a_3$, experiencing a variable extent left shift. To be explicit, it should be noted that a shift left of 0 bits causes digit $a_3$ to emerge in position $b_3$. There is, of course, no difference between a shift left of 0 positions and a shift right of 0 positions. The designation L and R, however, is conveniently maintained because of a possible associated shift in other stages. In any event, a shift of digit $a_3$ to one of the bit positions $b_0$, $b_1$, or $b_2$ results in a shift of 3L, 2L, or 1L, respectively.

Since a left shift and a right shift are mutually exclusive operations, and since the signal paths associated with a right shift of digit $a_0$ and a left shift from digit $a_3$ are identical, it is possible to combine the associated wiring paths and receiving gates on a circuit substrate. It is clear, of course, that additional control functions are required to be implemented to insure proper decoupling of signals originating from bit positions $a_0$ and $a_3$, for example.

Figure 2C:
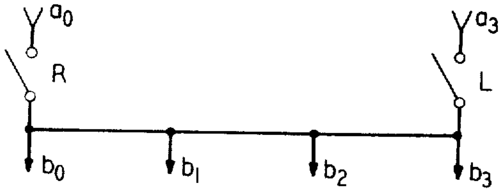

It is possible to show a combined signal path of the type indicated in FIG. 2C for each pair of input digits. In each case, there is a series of outputs going to digit positions $b_0$, $b_1$, $b_2$, and $b_3$. The inputs are paired as shown in FIG. 2C to permit both input digits $a_0$ and $a_3$ (corresponding to a desired right or left shift) to be translated to one of the outputs. Only one of a pair of inputs is selected at a given time, of course. It is clear that a similar combination of data paths and gates may be effected for corresponding ones of the other input digits. Thus, for example, input digits $a_1$ and $a_4$ may be combined at the input of the first stage of the shifter of FIG. 1 if suitable decoupling is provided. The possible output digits for input digits $a_1$ and $a_4$ are, of course, $b_1$, $b_2$, $b_3$, and $b_4$.

Figure 2D:
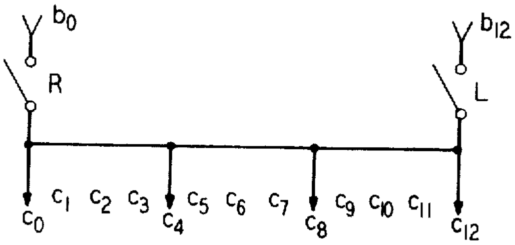
Figure 2E:
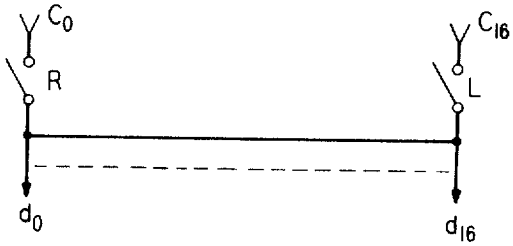

Further, it is clear that a symmetry existing between left and right shifts occurs not only at the first stage 101 in FIG. 1 but also occurs for subsequent stages 102 and 103. FIGS. 2D and 2E indicate the manner in which signal paths may be combined for the second and third stages of the network of FIG. 1. Thus, for example, input digits $b_0$ and $b_{12}$ are seen in FIG. 2D to share common paths for shifts (right and left, respectively) to digit positions $c_0$, $c_4$, $c_8$, and $c_{12}$. Although only typical input and output digit positions are shown explicitly in each case, it is clear that corresponding combinations of signal paths and gates are possible for each input digit position of a particular shifter stage.

Figure 3:
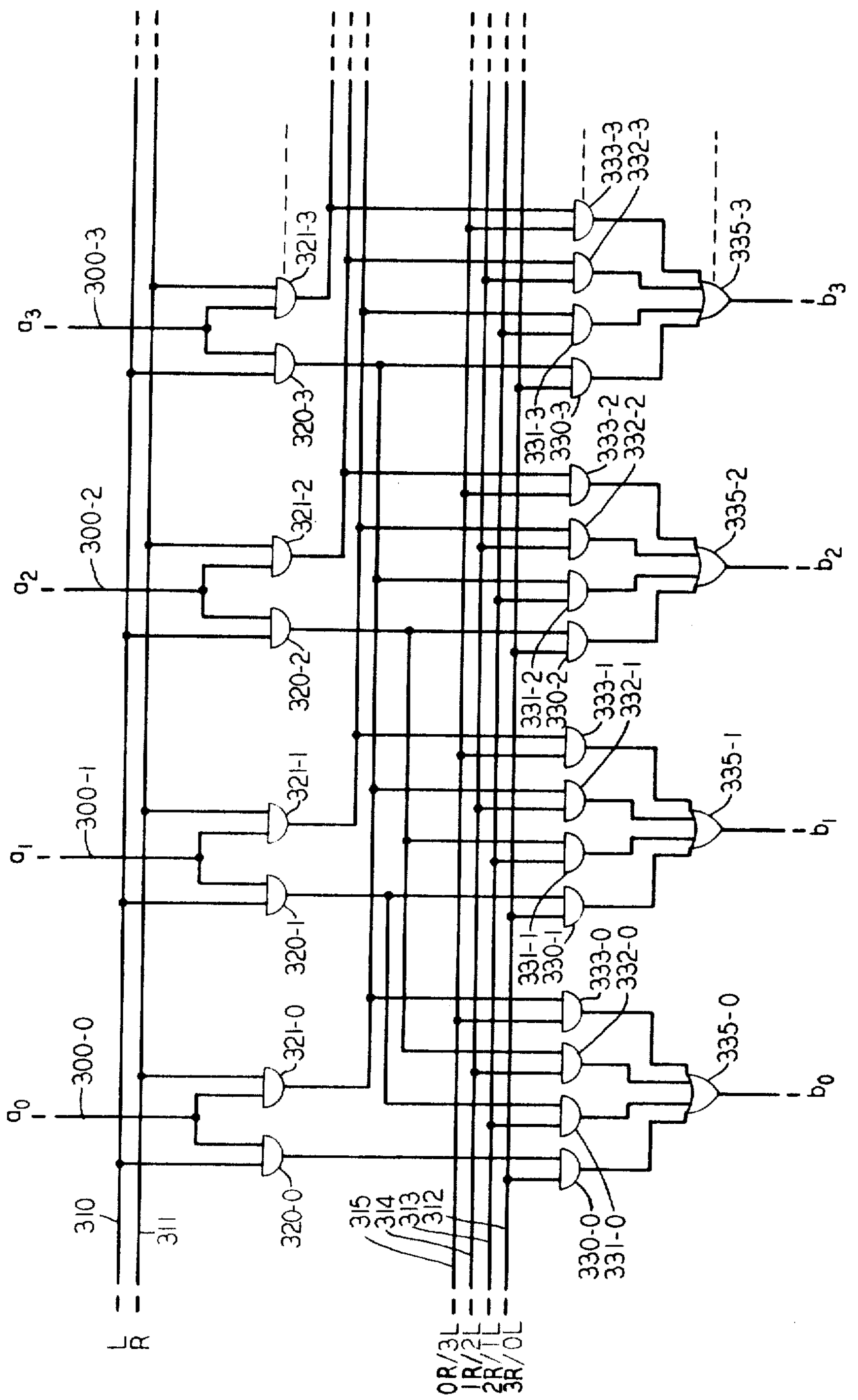
FIG. 3 shows a representative portion of the logic circuitry used to implement the first stage of the shifter of FIG. 1.

FIG. 3 shows a typical logic configuration for implementing and controlling the signal paths shown in FIGS. 2C–2E. To be more explicit, the circutiry of FIG. 3 controls the manner in which data bits appearing in positions $a_i$, $i = 0, 1, \ldots, 31$ are translated to corresponding output bit positions $b_i$, $i = 0, 1, \ldots, 31$. Because of the repetitive nature of the translation circuitry, only the first four input bit positions are shown explicitly.

The input data word is presented on leads 300–*i*, $i = 0, 1, \ldots, 31$ as shown at the top of FIG. 3. An indication of whether a left or right shift is desired is presented in the form of a signal on lead 310 or 311, respectively. For simplicity, a positive logic convention will be assumed, with 1 being represented by a positive signal and a 0 by a ground or low level. Other conventions are equally applicable when convenient under other system constraints.

A 1 signal appearing on lead 300–0, indicating a 1 appearing as digit $a_0$, when accompanied by a 1 signal on lead 310, indicating a desired left shift, causes AND gate 320–0 to have a 1 signal appear on its output. Because both a left shift and a right shift cannot be performed at the same time, thereby causing lead 311 to carry a 0 signal when lead 310 is in the 1 state, a 0 output appears at the output of AND gate 321–0 when a left shift is desired. Similarly, the digit $a_0$ is gated to appear as the output of AND gate 321–0 when a positive signal, indicating a desired right shift, appears on lead 311.

AND gates 320–i and 321–i may be substantially identical and may be realized using any standard circuit configuration. Thus, the input word $a_0, a_1, \ldots, a_{31}$ is gated to the output of AND gates 320–i or 321–i, depending on whether lead 310 or 311, respectively, is in the 1 state.

Additional inputs appearing on leads 312–315 in FIG. 3 determine the extent of a desired left or right shift. For simplicity, the manner in which the extent of a left shift is determined will be considered in detail first. Thus, for example, if a left shift of zero digits were desired, ($a_i$ translated to $b_i$, for all $i$) lead 312 is arranged to carry a positive signal to the input of each of the AND gates 330–$i$, $i = 0, 1, \ldots, 31$. The other input to AND gates 330-i is the output of respective AND gates 320–$i$.

When a left shift of 1 bit is desired, lead 313 is placed in a positive condition and the AND gates 331–$i$ are thereby selected. As for the case of a left shift of zero digits, the other input to each of the AND gates 331–$i$ (except for the input to gate 331–31) is supplied by one of the AND gates 320–$i$. In each case, however, the input is from gate 320–($i$+1), i.e., the gate associated with the next digit to the right in FIG. 3. The input to gate 331–31 which would have come from the gate corresponding to input digit $a_{32}$ is simply omitted, or grounded, thereby causing a 0 to be effectively shifted in from the left.

Left shifts of 2 or 3 digits (indicated by 1 signals on leads 314 and 315, respectively) are effected in a similar manner, except that the input to the selected AND gates (332–i and 333–i, respectively) are derived from AND gates 320–j, where $j = i+2$ for a 2-digit shift and $j = i+3$ for a 3-digit shift. Again inputs which would be supplied by gates 320–$j$ with $j$ greater than 31 are omitted or grounded, thereby causing 0's to be "shifted" into the rightmost bit positions $b_{31}$, $b_{30}$ for a 2-digit left shift and $b_{31}$, $b_{30}$ and $b_{29}$ for a 3-digit left shift.

For each selected left shift, only one of the gates 330–$i$, 331–$i$, 332–$i$ or 333–$i$ is operative. The outputs of these gates are supplied as inputs to corresponding OR gates 335–$i$. The outputs of OR gates 335–$i$ are, as indicated in FIG. 3, the appropriate outputs of the first stage or tier of the shifter of FIG. 1.

The operation of the circuit shown in FIG. 3 for right shifts should now be obvious. Thus, selection signals are provided on appropriate ones of leads 312–315. Similarly, input words are presented upon leads 300–0 through 300–31. In the case of right shifts, a positive or 1 signal is applied to lead 311. This causes gates 321–0 through 321–31 to be selected. The outputs from AND gates 321–$i$ then are connected to corresponding ones of AND gates 330–$j$ through 333–$j$. In each case $j$ will exceed $i$ by not more than 3. The outputs from the gates 330–$j$ through 333–$j$ for each value of $j$ are connected as inputs to respective OR-gates 335–$j$. As before, the desired shifted outputs appear as digits $b_0$ through $b_{31}$ on the outputs of OR-gates 335–$j$.

As is seen in FIG. 3, it is possible to use a single control lead for controlling the extent of a left shift of a predetermined extant and a right shift of a complementary distance. In particular, it is seen that the same extent-determining control lead 312 may be used to designate a right shift of 3-digit positions and also for controlling a left shift of 0 positions. As was mentioned above, of course, a right shift and a left shift cannot be performed at the same time. Rather a left shift is selected by a signal on lead 310 while a right shift is selected by a 1 signal on lead 311. The manner in which control signals are generated for application to leads 312–315 will now be considered.

It should be noted in FIG. 3 that the outputs of the AND gates 320–$i$ and 321–$i$ controlled by the left and right control signals for a given signal path are ORed by the signal path.

If binary codes are assigned to each control signal for indicating a right shift distance (as shown in Table 1), the corresponding left shift distances listed for the same code are conveniently chosen as in Table 1. The resulting left shift codes are one's complements of the right shift codes for equal shift distance. The right shift distance can therefore be gated to the shifter from the true outputs of the shift distance decoder register and the left shift distance gated from the complement outputs of the register. Another scheme, for generating the control signals is to store the shift distances in the decoder register in one's complement form with negative numbers representing the distance for a left shift and positive numers representing the distance for a right shift.

TABLE 1

| Right Shift Distance | Binary Code | Left Shift Distance |
|---|---|---|
| 0 | 00 | 3 |
| 1 | 01 | 2 |
| 2 | 10 | 1 |
| 3 | 11 | 0 |

Figure 4:
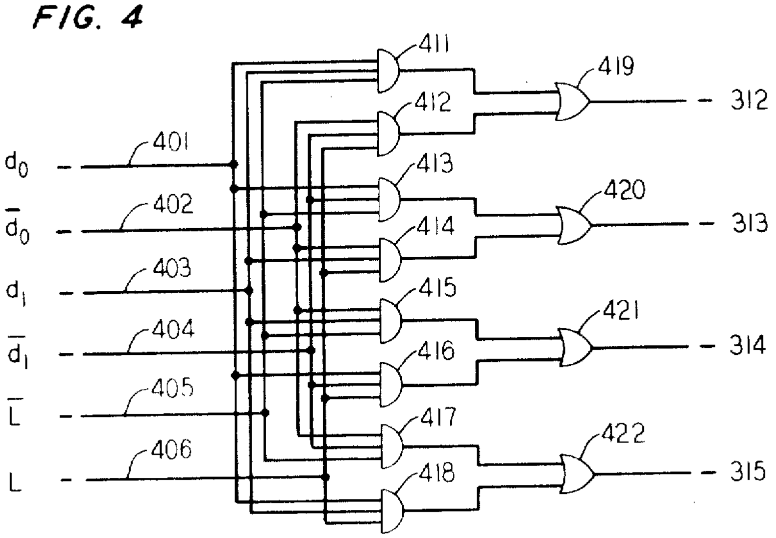
FIG. 4 shows decoding circuitry for deriving control signals used in the shifting circuit of FIG. 3.

The manner in which the control signals shown as stored in register 110 in FIG. 1 are effective to control the shifting through the 3-stage network shown in FIG. 1 is illustrated by the circuitry of FIG. 4. It is assumed that the true and false values for each digit stored in register 110 in FIG. 1 are available. Further, it is assumed that the digit indicating a left or right shift is a positive function based on the left shift. That is, it is assumed that a 1 in the digit position indicated in FIG. 1 in register 110 by the designation L/R is a 1 when it is desired that a left shift be performed. Of course, a 0 is contained in that position when a right shift is performed. However, it will be assumed that both the true and false indications for the L (left) function are available.

These input function values are shown at the left in FIG. 4. Thus, the true and false values for the digit $d_0$ appear on leads 401 and 402, respectively. Similarly, the true and false values for the digit $d_1$ appear on respective leads 403 and 404. The true value for the L (left) function appears on lead 406, and its complement $\bar{L}$ (right) appears on lead 405. The eight possible combinations of the input values are translated by AND-gates 411 through 418, as shown in FIG. 4. Finally, the related translations are OR-ed using gates 419 through 422. Thus a 1 input on leads 401 and 403 with a 1 value on lead 405 causes a 1 output to appear at gate 411. This is indicative of a right shift of 3 digit positions. Similarly, a 1 value on input leads 402, 404 and 406 causes a 1 output to appear at gate 412. This is indicative of a desired left shift of 0 positions. As indicated in the circuit in FIG. 3, these two control inputs are desirably paired on lead 312. This function is performed by OR-gate 419 whose output is the indicated lead 312. Other combinations of input signals appearing on leads 401 through 406 are similarly selected by the AND-gates 411 through 418 and are paired using corresponding OR-gates 419 through 422. The circuitry of FIG. 4 is advantageously interposed between digits $d_0$ and $d_1$ shown forming part of register 110 in FIG. 1, and tier logic 101 in FIG. 1.

L and $\bar{L}$ (equivalent to R in FIG. 3) leads 405 and 406 are also supplied to leads 310 and 311 to indicate left and right shifts in tier logic 101. Similar imputs are, of course, supplied to corresponding L and R leads in other tier logic stages. The shifter circuitry of FIG. 3 is easily converted to a barrel switch by replacing the zero-inserting connections with signal connections from the right edge of the shifter to the left edge, making each tier circular in nature. These connections are run under the substrate on which the gating is implemented, or across it.

From the above, it is clear that an input word may be shifted upon passage through a combinatorial logic stage like 101 shown in FIG. 1, to partially shift a word through a number of digit positions indicated by the contents of a register like 110 in FIG. 1. Although the circuitry of FIGS. 3 and 4 explicitly discloses the details for realizing logic to implement the stage 101 in FIG. 1, it is clear that equivalent techniques employing the same logic scheme may be used to realize the logic stages 102 and 103 in FIG. 1. Since stage 102 is responsive to a 2-digit pattern in the same manner as logic stage 101, a circuit equivalent to that shown in FIG. 4 may be used to perform the decoding of desired shift information for stage 102. Similarly, stage 102 provides for each of its input digits to be shifted by 0, 4, 8 or 12 digit positions in a left or right direction.

Accordingly, a circuit substantially identical to that shown in FIG. 3 may be used to perform the desired digit translation. The only changes required to implement the detailed circuitry for stage 102 from those detailed shown in FIG. 3 relate to the interconnection of the outputs of AND gates 320–*i* and 321–*i* to corresponding individual AND gates 330–*j*. That is, while the circuitry shown in FIG. 3 provides for at most a translation of 3-digit positions, the connections required for implementing stage 102 in FIG. 1 include connections extending over as many as 12 digit positions with output leads occurring for every fourth bit instead of for each consecutive bit position. In all other respects, however, the operation of FIG. 3 may be adopted in effecting shift circuitry corresponding to stage 102 in FIG. 1.

Similarly, a degenerate version of the circuit shown in FIG. 3 may be used to implement the logic stage 103 shown in FIG. 1. Thus, since logic stage 103 requires only one of two possible shift distances, a circuit like that shown in FIG. 3 may be used which has only two AND gates connected to the terminal OR gate. Similarly, only two input control leads need be provided to select between these two AND gates. Accordingly, only two input leads of the type shown in FIG. 3 by the designations 312–315 need be provided. These leads and the signals on them may be derived from a circuit of the type shown in FIG. 4 including, however, only the lower half of the circuitry shown in FIG. 4.

The above detailed description has proceeded in terms of hypothetical 32-bit input word. The consequence of this word length selection is that the maximum shift distance is limited to 31 digit positions. It is clear, however, that the technique described in detail above may be applied to input words of any length. Similarly, it is clear that using a suitably extended or contracted control word of the type shown stored in register 110 in FIG. 1, it is possible to control a shift of any practical distance. In all cases, however, the combination of redundant signal paths into a single data path may be effected using the techniques described above.

Figure 5:
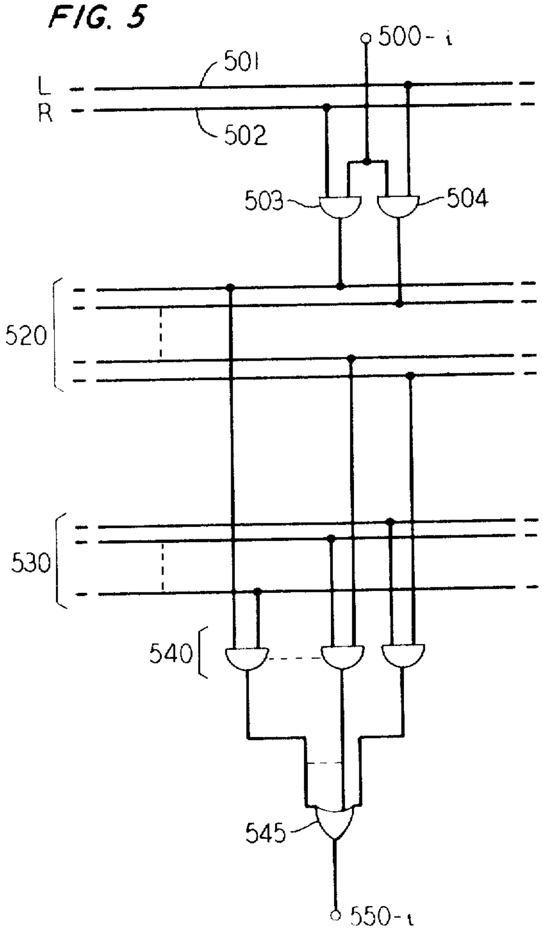
FIG. 5 shows a generic circuit for performing shifting associated with one digit position in one stage of a network of the general form shown in FIG. 1.

FIG. 5 shows a generic stage for circuitry of the type required to perform required shifts of any extent. Thus, a signal appearing on input lead 500–*i* shown at the top of FIG. 5 is selected by signals appearing on one of the leads 501 and 502. This initial selection, as above, is for purposes of determining whether a left or right shift is to be performed. The actual shift is again performed by an AND gate, in this case indicated by gates 503 and 504 in FIG. 5. The outputs from gates 503 and 504 are shown connected to a bus system including a plurality of bus lines. These lines are indicated collectively by the designation 520 in FIG. 5. In general, the number of buses included in a given bus system of the type shown as 520 in FIG. 5 will be determined by the maximum number of partial shift which may be accomplished at the given stage of shifting. For example, if a 3-stage network of the type shown in FIG. 1 were used, but the initial stage 101 were arranged to provide for shifts of any one of eight digit distances, then the bus system 520 in FIG. 5 would include eight separate buses.

The signals broadcast on the buses 520 by respective AND gates 503 and 504 in FIG. 5 are selected by a plurality of AND gates 540. It should be understood, of course, that there is an AND gate 503 and an AND gate 504 for each input digit. Thus, signals appearing on the various buses 520 may originate with any of a plurality of gates equal in number to the number of digits in the input word. The number of AND gates 540 connected to a given one of the buses 520 will depend upon the number of digit positions to which a given input digit may be shifted. Thus, in the example given above, the number of gates 540 for the stage 101 in the network of FIG. 1 was equal to four, because the first stage permitted any one of four different input digit positions to provide data for a given output digit.

The selection of the extent of a desired shift is, as in the case in the circuit of FIG. 3, determined by a selection signal appearing on one of a plurality of control leads 530. Each digit position of the type shown in FIG. 5 will have a control lead attached to a respective one of the AND gates 540. OR gate 545 provides an output on lead 550–*i* for each input word presented at the inputs 500–*i*.

While the above detailed description has proceeded in terms of a particular positive logic convention, other equivalent logic conventions and circuit modules associated therewith may be conveniently adapted for use in realizing the instant invention. Similarly, other than the 32-bit input word may be used and other than three stages of cascaded combinatorial logic may be used to effect the overall desired shift.

An important extension of the instant invention obvious to those skilled in the art in light of the above detailed description is the modification of the various circuit configurations for realizing a so-called barrel switch. As can be seen from the generic configuration in FIG. 5, the buses 520 may be derived from signals originating at any digit position 500–*i*. In particular, when the configuration shown in FIG. 5 represents the leftmost digit position in a given stage of combinatorial logic, such as 101 in FIG. 1, an input to a bus selectable by AND gates 540 may include information originating at the rightmost digit position in an input word. Further, this latter signal may be the result of a desired right shift of one digit position. That is, a circular shifting of one bit from the most significant digit position to the least significant digit position in the manner of a recirculating shift register may be accomplished using the instant teachings. It should be clear, then, that the data in an input digit position removed by one from the rightmost digit position may similarly be directed to the leftmost digit position at the output of a stage of combinatorial switching by a right shift of two digit positions. This is accomplished by effecting a broadcasting of the input signal on one of the buses 520 for selection by an AND gate 540 associated with the leftmost digit position.

Additional modifications may be incorporated in the circuitry shown in FIG. 3 (and corresponding circuitry for other stages of a shifting network in accordance with the instant invention) which permit overflow information to be treated specially. That is, if, as a result of a particular left shift, information tends to be shifted out of the leftmost digit positions in a stage of combinatorial logic of the type shown in FIG. 3, then additional flip-flops or shift register stages may be connected to the appropriate ones of the buses deriving from the AND gates 320-0 and 321–0. Information shifted into these shift registers or flip-flops may then be used explicitly or merely monitored to determine that an overflow has in fact occurred.

While the above detailed description has been directed to circuitry for providing a desired left or right shift of arbitrary extent, it is possible, and sometimes desirable, to include in a digit position of a stage of shifting such as that shown in FIG. 5, additional logic circuitry for performing a variety of functions. Thus, it is clear that, by introducing additional gating at the output (or at other points in the signal paths in FIG. 5) masking of prescribed output digit positions may be effected.

Numerous and varied other modifications and extensions of the above teachings within the spirit and scope of the attached claims will occur to those skilled in the art.

What is claimed is:

1. Apparatus, responsive to first and second control signals indicative of the direction and extent, respectively, of a desired shift, for generating an ordered set of output signals corresponding to a shifted version of an ordered set of input signals comprising A. a plurality of ordered stages, each of which comprises combinatorial logic circuit means for shifting a set of input signals over a range representing a part of a desired shift distance, wherein said combinatorial logic means includes means for combining signal paths corresponding to a shift in a given direction with signal paths corresponding to a shift of a complementary distance in the opposite direction, and B. means for applying the output signals from a given stage as the input signals of a succeeding stage, the output from the last stage being the desired set of shifted output signals.

2. Apparatus according to claim 1 further comprising means for inhibiting selected ones of the output signals from one or more of said stages.

3. Apparatus according to claim 1 wherein said combinatorial logic circuit means comprises A. a plurality of output terminals each associated with one of said output signals, B. first means responsive to said first control signals for selecting, for each of said input signals, a bus for one of two different shift directions, and C. second means, responsive to said second control signals, for selectively connecting said busses to said output terminals.

4. Apparatus according to claim 3 wherein said first means comprises for each input signal A. first and second two-input direction AND gates, B. means for applying said input signal to a first input of each of said direction AND gates, and C. means for applying said first control signals to the second input of each of said direction AND gates.

5. Apparatus according to claim 3 wherein said second means comprises a logic network associated with each output, said logic network comprising A. a plurality of multiple-input, one-output, selection AND gates, each having one input connected to one of said busses, B. means for applying said second control signals to other inputs of said selection AND gates, and C. a plurality of OR circuits, each connecting a plurality of outputs of said selection AND gates to one of said output nodes.

* * * * *